(No Model.)

S. SMITH.
COOKING UTENSIL.

No. 478,376. Patented July 5, 1892.

Witnesses.
L. G. Welker.
P. H. Downey.

Inventor:
Sarah Smith
By Almon Hall
Her Attorney.

UNITED STATES PATENT OFFICE.

SARAH SMITH, OF TOLEDO, OHIO.

COOKING UTENSIL.

SPECIFICATION forming part of Letters Patent No. 478,376, dated July 5, 1892.

Application filed June 6, 1891. Serial No. 395,364. (No model.)

*To all whom it may concern:*

Be it known that I, SARAH SMITH, a citizen of the United States, residing at East Toledo, Lucas county, Ohio, have invented certain new and useful Improvements in Cooking Utensils, of which the following is a specification.

My invention relates to kettles or stew-pans, and more particularly to the cover for the same and the means of fastening the cover in place; also, to a removable horizontal steaming-partition for such kettle or pan.

My invention has for its objects, first, to utilize the bail-ears as a simple, cheap, and effective means of attaching or detaching the cover; second, to provide such cover with a strainer having a removable and nearly steam-tight lid, and, third, to provide such kettle or pan with a perforated removable horizontal partition adapted to serve as a steaming attachment and having a lid through which access may be had to the lower compartment of the kettle or pan when the partition is in place without disturbing the contents of the vessel. I attain these objects by means of the device illustrated in the accompanying drawings, made part hereof, in which—

Figure 1:
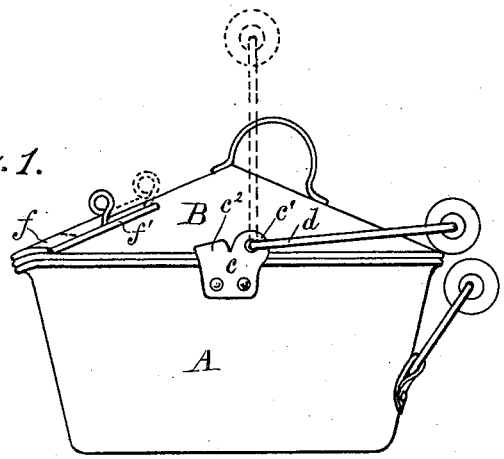
Figure 2:
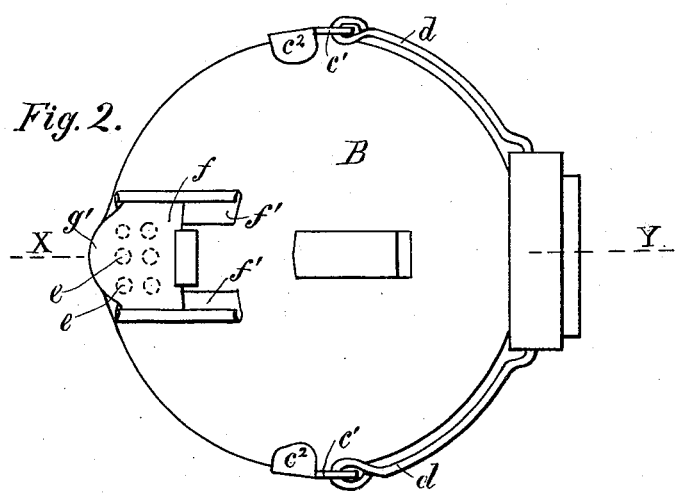
Figure 3:
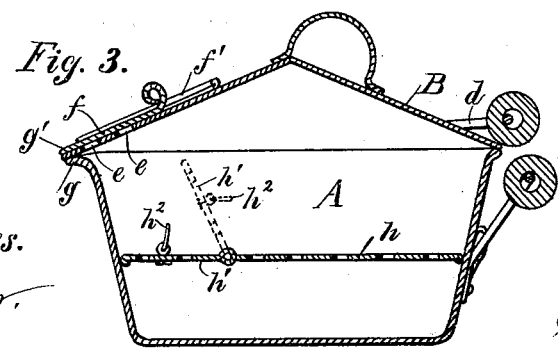

Figure 1 is a side elevation of my device. Fig. 2 is a plan of the same; and Fig. 3 is a central vertical section on line X X, Fig. 2.

In the drawings, A designates the body of the kettle or pan, B the cover or lid, and $c$ the ear riveted to the kettle, to which ear the bail $d$ is attached. The ear $c$ is split to form two upwardly-projecting parts, as shown in Figs. 1 and 2, one of the parts $c'$ being pierced to receive the hook of the bail, the other part $c^2$ being bent inwardly and downwardly over the upper edge of the kettle. The lid may be readily slipped to and fro edgewise under the inwardly-projecting lip $c^2$, which holds the lid closely in place, preventing the lid from falling off when the kettle is tilted. The lid has perforations $e$, through which the liquid contents of the kettle may be drained off.

To prevent the escape of steam through perforations $e$, I provide a cap $f$, which slides in grooved pieces $f'$, and which, by sliding the cap to and fro, may be made to cover and uncover the perforations $e$ at will.

I prefer to form the kettle with a mouth $g$ and to provide the sliding cap $f$ with a projecting lip $g'$, coinciding with mouth $g$; but this may be omitted without departing from my invention.

The interior of my kettle is provided with a perforated removable horizontal partition or false bottom $h$, resting upon suitable lugs or projections on the inner side, provided near one side with a hinged door $h'$, which may be conveniently lifted by means of ring $h^2$. (See Fig. 3.)

Meat or other food may be cooked in the lower compartment and vegetables or other food may at the same time be steamed in the upper compartment.

When it becomes necessary to inspect the contents of the lower compartment, it may be readily and conveniently done (without disturbing the contents of the upper compartment) by partly removing lid B and raising hinged door $h$.

Having fully described the construction and operation of my invention, what I claim, and desire to secure by Letters Patent, is—

1. In a cooking utensil of the class described, the bifurcated bail-ears, one branch thereof engaging the bail, the other branch being bent inwardly and adapted to hold the lid in place, substantially as shown and described, for the purpose specified.

2. In a cooking utensil of the class described, a perforated removable horizontal partition or false bottom provided at one side with a hinged door, substantially as shown and described, for the purpose specified.

SARAH SMITH.

In presence of—
 ISAAC N. HUNTSBERGER,
 LIBBIE BROWN.